United States Patent
Wenz et al.

(10) Patent No.: US 8,820,790 B2
(45) Date of Patent: Sep. 2, 2014

(54) VEHICLE SEAT

(75) Inventors: Frank Wenz, Erzenhausen (DE); Sasa Galijasevic, Kaiserslautern (DE); Thomas Jung, Wahnwegen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 13/879,338

(22) PCT Filed: Oct. 5, 2011

(86) PCT No.: PCT/DE2011/075242
§ 371 (c)(1),
(2), (4) Date: Jun. 24, 2013

(87) PCT Pub. No.: WO2012/052015
PCT Pub. Date: Apr. 26, 2012

(65) Prior Publication Data
US 2013/0278042 A1    Oct. 24, 2013

(30) Foreign Application Priority Data
Oct. 18, 2010   (DE) .................. 10 2010 049 201

(51) Int. Cl.
*B60R 22/26*   (2006.01)

(52) U.S. Cl.
USPC ......... 280/808; 280/801.1; 297/468; 297/483

(58) Field of Classification Search
USPC ............ 280/801.1, 808; 297/452.18, 452.48, 297/468, 482, 483
See application file for complete search history.

(56) References Cited

U.S. PATENT DOCUMENTS 3,995,885 A * 12/1976 Plesniarski .................. 297/474
4,730,875 A *  3/1988 Yoshitsugu ................. 297/468

(Continued)

FOREIGN PATENT DOCUMENTS

DE    16 10 348          7/1970
DE    3613830 A1 * 10/1987 .............. B60R 22/26

(Continued)

OTHER PUBLICATIONS

International Search Report received in connection with international application No. PCT/DE2011/075242; dtd Apr. 5, 2012.

(Continued)

*Primary Examiner* — Ruth Ilan
*Assistant Examiner* — Laura Freedman
(74) *Attorney, Agent, or Firm* — Foley & Lardner LLP (57) ABSTRACT

A vehicle seat includes a sitting part structure and a seatback structure which is arranged so as to pivot at its lower end on the sitting part structure and is covered by a seatback cover and to which, in its upper region on the vehicle sill side, is secured a belt deflector. The belt deflector has a belt runner opening for a seatbelt, which faces in the longitudinal direction of the vehicle. The seatbelt is guided out of an automatic belt roller mechanism, which accommodates one end of the seatbelt, through the belt runner opening in the belt deflector. The belt deflector is covered by the seatback cover which has a belt-passage through-opening which coincides with the belt runner opening and is covered on the front face of the seatback by a belt cover which has a belt-guide slot and is connected to the seatback cover.

10 Claims, 7 Drawing Sheets

(56) References Cited

U.S. PATENT DOCUMENTS

| | | | | |
|---|---|---|---|---|
| 5,246,271 | A * | 9/1993 | Boisset | 297/362.13 |
| 5,544,917 | A * | 8/1996 | Loxton et al. | 280/801.2 |
| 5,556,171 | A * | 9/1996 | Busch | 297/483 |
| 5,575,533 | A * | 11/1996 | Glance | 297/452.2 |
| 5,599,070 | A * | 2/1997 | Pham et al. | 297/483 |
| 5,609,396 | A * | 3/1997 | Loxton et al. | 297/473 |
| 5,658,051 | A * | 8/1997 | Vega et al. | 297/483 |
| 5,697,670 | A * | 12/1997 | Husted et al. | 297/216.13 |
| 5,716,073 | A * | 2/1998 | Redman | 280/801.1 |
| 5,722,732 | A * | 3/1998 | Haldenwanger | 297/483 |
| 7,510,245 | B2 * | 3/2009 | Okazaki et al. | 297/483 |
| 7,566,075 | B2 * | 7/2009 | Latour et al. | 280/808 |
| 7,635,167 | B2 * | 12/2009 | Okazaki | 297/483 |
| 7,735,934 | B2 * | 6/2010 | Fuhrken et al. | 297/483 |
| 8,123,293 | B2 * | 2/2012 | Marriott et al. | 297/216.13 |
| 2005/0110328 | A1 | 5/2005 | Kennedy, Sr. | |

FOREIGN PATENT DOCUMENTS

| | | | | |
|---|---|---|---|---|
| DE | 4209391 | A1 * | 10/1992 | B60N 2/22 |
| DE | 102007062636 | | 7/2009 | |
| EP | 374893 | A2 * | 6/1990 | B60R 22/20 |
| JP | 01314647 | A * | 12/1989 | B60R 22/24 |
| JP | 05-112205 | A | 5/1993 | |
| JP | 05112205 | A * | 5/1993 | B60R 22/26 |
| JP | 10-181524 | A | 7/1998 | |
| JP | 2005-001436 | A | 1/2005 | |
| JP | 2009-166639 | A | 7/2009 | |
| WO | WO-2009/080190 | A1 | 7/2009 | |

OTHER PUBLICATIONS

International Preliminary Report on Patentability (IPRP) in PCT/DE2011/075242 dated Apr. 23, 2013.

Office Action dated Mar. 4, 2014 in corresponding Japanese Application No. 2013-522106.

* cited by examiner

VEHICLE SEAT

CROSS REFERENCE TO RELATED APPLICATIONS

The present application is a National Stage of International Application No. PCT/DE2011/075242 Filed on Oct. 5, 2011, which claims the benefit of German Patent Application No. 10 2010 049 201.9 filed on Oct. 18, 2010, the entire disclosures of which are incorporated herein by reference.

The invention relates to a vehicle seat, in particular a motor vehicle seat, comprising a seat part structure and a backrest structure pivotably arranged with its lower end on the seat part structure and covered by a backrest lining, a belt deflector with a belt runner opening for a seat belt being fastened to the upper region of said backrest structure on the vehicle sill side, said belt runner opening being oriented in the longitudinal direction of the vehicle, and said seat belt being guided out of a belt roller mechanism fixedly receiving one end of the seat belt, through the belt runner opening of the belt deflector.

In such vehicle seats, it is known to arrange the belt deflector on the backrest structure, protruding from the seat cover.

This results in a visually unattractive vehicle seat.

SUMMARY

It is, therefore, the object of the invention to provide a visually attractive vehicle seat of the aforementioned type, the belt deflector thereof having a clearly defined belt deflection point.

This object is achieved according to the invention by the belt deflector being covered by the backrest lining, wherein the backrest lining comprises a continuous belt through-opening which coincides with the belt runner opening, said belt through-opening being covered on the backrest front face by a belt cover comprising a belt guide slot, fixedly connected to the backrest lining and not fixedly connected to the belt deflector.

As the belt deflector is covered by the backrest lining, the vehicle seat is afforded a pleasing appearance.

This pleasing appearance is not disrupted by the belt cover which covers the belt through-opening in the backrest lining.

As the belt cover is not fixedly connected to the belt deflector but to the flexible backrest lining, it is always adapted in its position to the seat belt, so that the position of the belt deflection point on the belt deflector located in the belt runner opening is not affected by the belt cover.

The seat belt is arranged correctly on the vehicle seat when the seat belt is guided from the belt roller mechanism arranged on the rear face of the vehicle seat in the floor region, over the rear face of the vehicle seat or the backrest structure to the belt deflector, through the belt runner opening thereof and the belt through-opening and the belt guide slot to the backrest front face and from there to a belt end fitting arranged on the seat structure on the vehicle sill side, and with its second end is fixedly connected to the belt end fitting, wherein an insertion tongue is displaceably arranged between the belt guide slot and the belt end fitting on the seat belt, and is able to be connected to a lock arranged on the seat structure on the tunnel side.

Preferably, in this case the belt roller mechanism is fastened to the rear face of the seat part structure.

To improve the pleasing appearance further, the seat belt may be guided inside the backrest lining which covers the backrest on the backrest front face and the backrest rear face, from the belt roller mechanism to the belt deflector.

For fastening the belt cover to the backrest lining preferably the belt cover, which bears against the backrest lining on the backrest front face, is connected to a lining cover partially encompassing the backrest lining and comprising a through-opening aligned with the belt runner opening and the belt guide slot.

In this case, the belt cover is able to be easily mounted when the belt cover is connected by means of a latching connection to the lining cover.

If the lining cover consists of a cover front part bearing on the backrest lining on the backrest front face and a cover rear part bearing on the backrest lining on the backrest rear face, which are connected together, wherein the belt cover bears on the backrest lining via the cover front part, by simple positioning of the cover front part and the cover rear part on the backrest lining and connecting the two cover parts together, the lining cover may be fastened to the backrest lining, so that the lining cover is able to be premounted with the backrest lining before the backrest structure is covered.

Tools and fastening elements are not required in this case if the cover front part and the cover rear part are able to be connected together by means of a latching connection.

If the belt runner opening of the belt deflector and/or the through-opening of the lining cover have a cross section permitting the belt end fitting to be passed through, the seat belt may be guided in advance with the belt end fitting through the belt runner opening of the belt deflector and through the belt through-opening of the lining cover in a manner in which it is able to be easily assembled, after the backrest structure part has been covered with the backrest lining and toward the vehicle sill side of the seat structure, in order to be fastened there, for example, by means of screws.

Twisting of the seat belt when it is passed through the belt guide slot when rolled up by the belt roller mechanism is prevented by the cross section of the belt guide slot corresponding to the cross section of the seat belt.

The belt cover may be mounted in a simple manner, after the seat belt has been fully fitted, when the belt cover has a thread-in slot connecting the belt guide slot with the peripheral contour of the belt cover, running in the direction of extension of the seat belt.

Thus the seat belt is able to be inserted transversely to its longitudinal extent through the thread-in slot into the belt guide slot. Then the connection of the belt cover to the backrest lining and/or the lining cover is made.

BRIEF DESCRIPTION OF THE DRAWINGS

An exemplary embodiment of the invention is shown in the drawings and is described in more detail hereinafter, in which.

DETAILED DESCRIPTION

Figure 1:
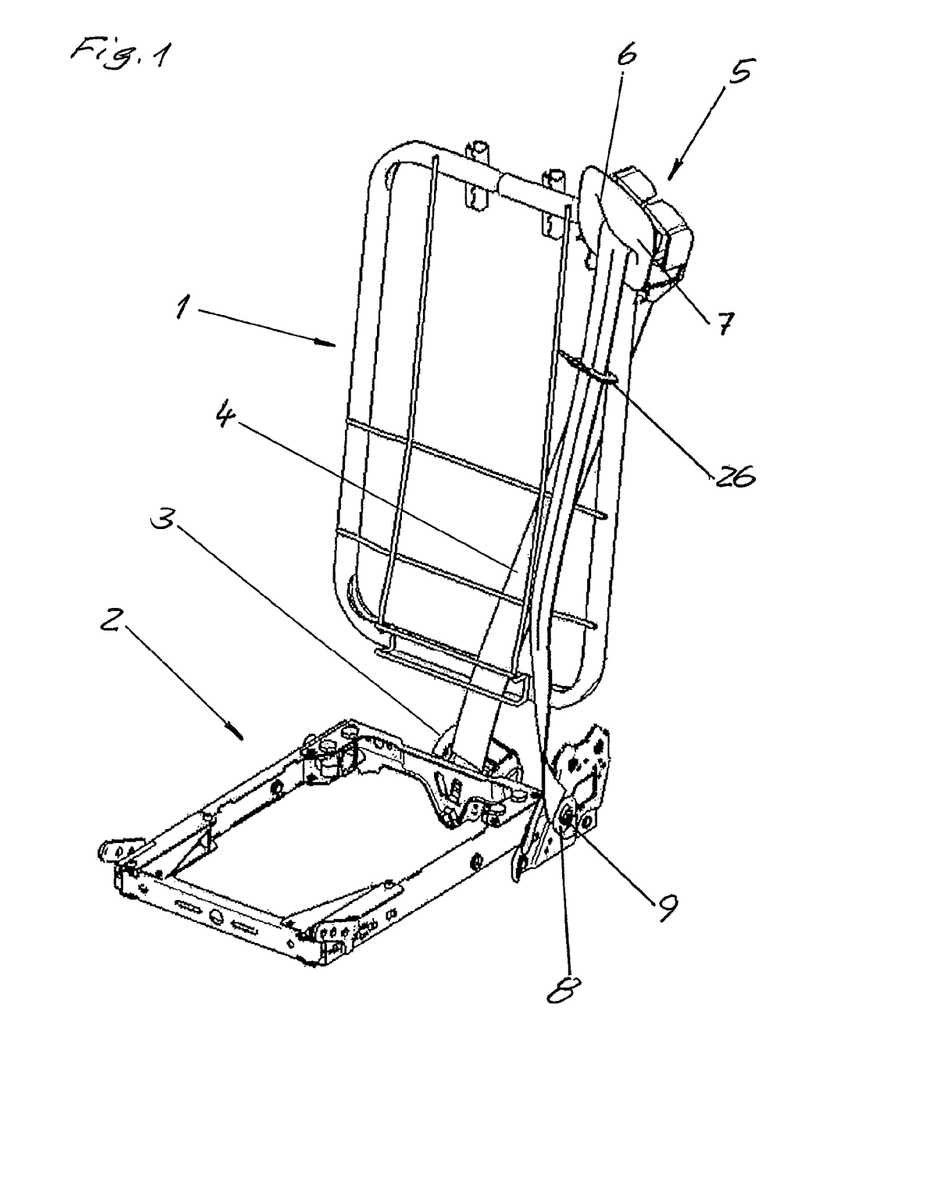
FIG. 1 shows a perspective view of the structures of a motor vehicle seat with the seat belt device.

FIG. 1 shows a backrest structure 1 and a seat part structure 2 for a motor vehicle seat on the driver's side of a motor vehicle.

A belt roller mechanism 3 is fastened centrally to the rear face of the seat part structure 2, said belt roller mechanism receiving one end of a seat belt 4 and rolling up said end of a seat belt when the seat belt 4 is not used.

The seat belt 4 is guided by the belt roller mechanism 3 toward the upper corner region of the backrest structure 1 on the vehicle sill side, to a belt deflector 5 screwed fixedly to the backrest structure 1.

The seat belt 4 passes through the belt deflector 5 and a belt guide slot 6 of a belt cover 7 arranged to the front thereof and on to the rear end of the seat part structure 2 on the vehicle sill side and at its second end has a belt end fitting 8 which is fastened by a screw 9 to the seat part structure 2.

Figure 2:
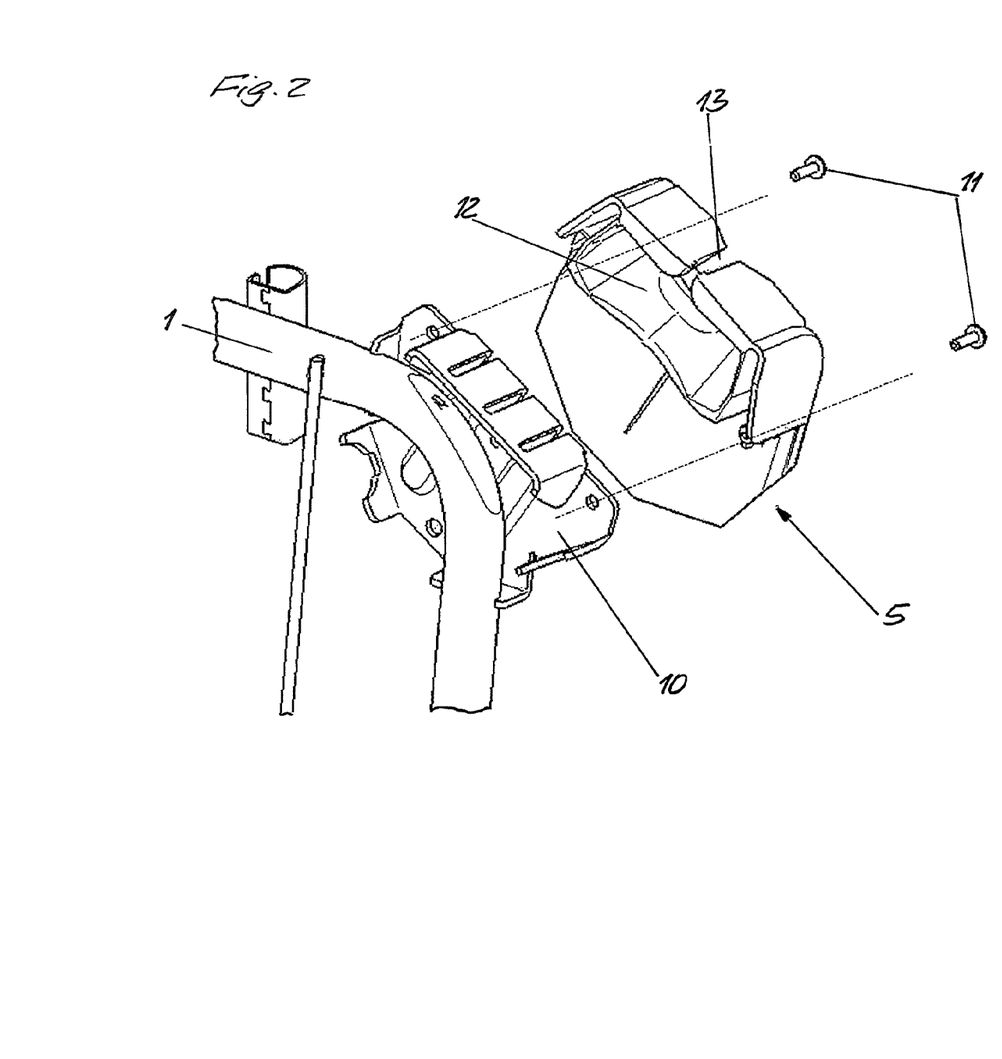
FIG. 2 shows an enlarged perspective detail of the upper region of the backrest structure of the vehicle seat on the vehicle sill side, according to FIG. 1.

As is visible in FIG. 2, a belt deflector holder 10 is welded to the upper corner region of the backrest structure 1 on the vehicle sill side, and the belt deflector 5 is able to be connected fixedly to the belt deflector holder 10 by means of screws 11.

For easy insertion of the seat belt 5 into the belt runner opening 12 of the belt deflector 5, a continuous insertion slot 13 leads from the upper outer contour of the belt deflector 5 to the belt runner opening 12.

Figure 3:
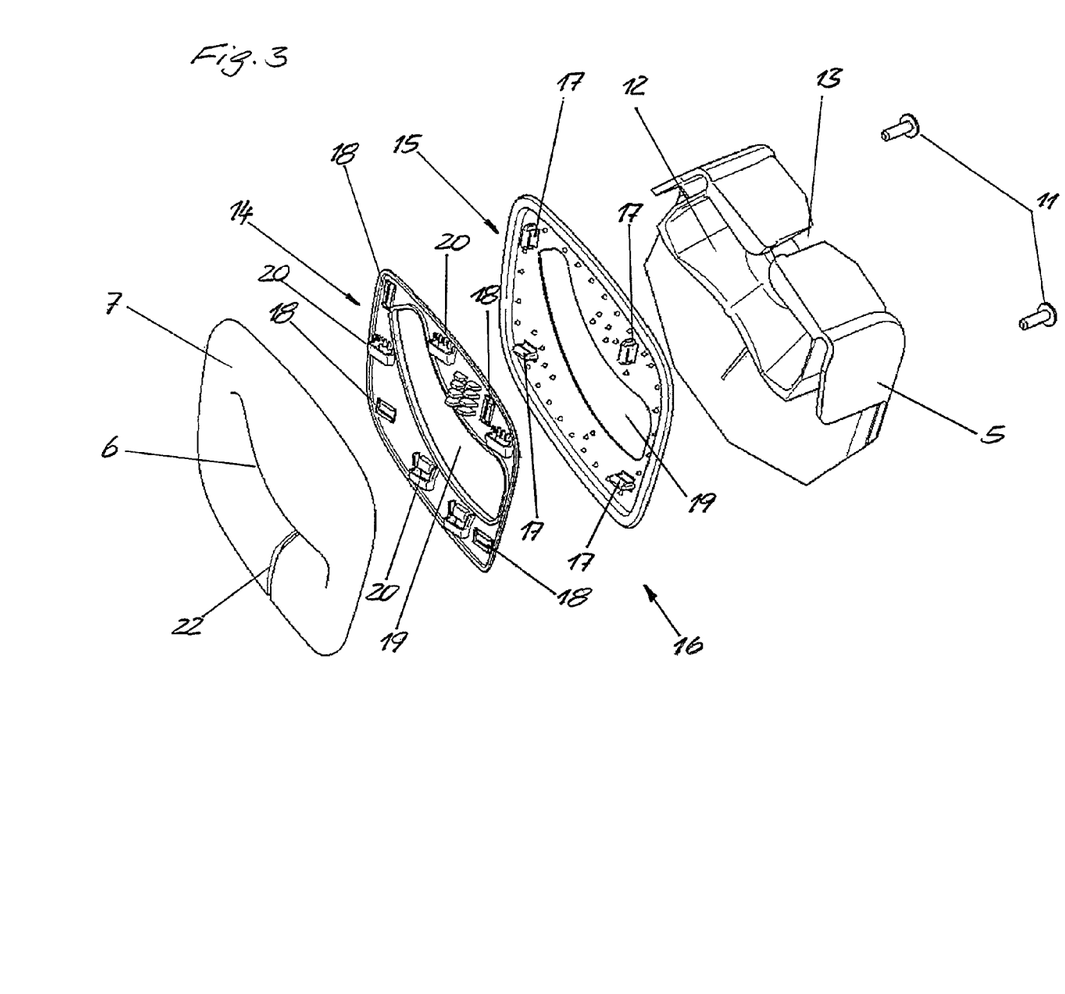
FIG. 3 shows a perspective exploded view from the front of a belt deflector, a lining cover and a belt cover of the seat belt device according to FIG. 1.
Figure 4:
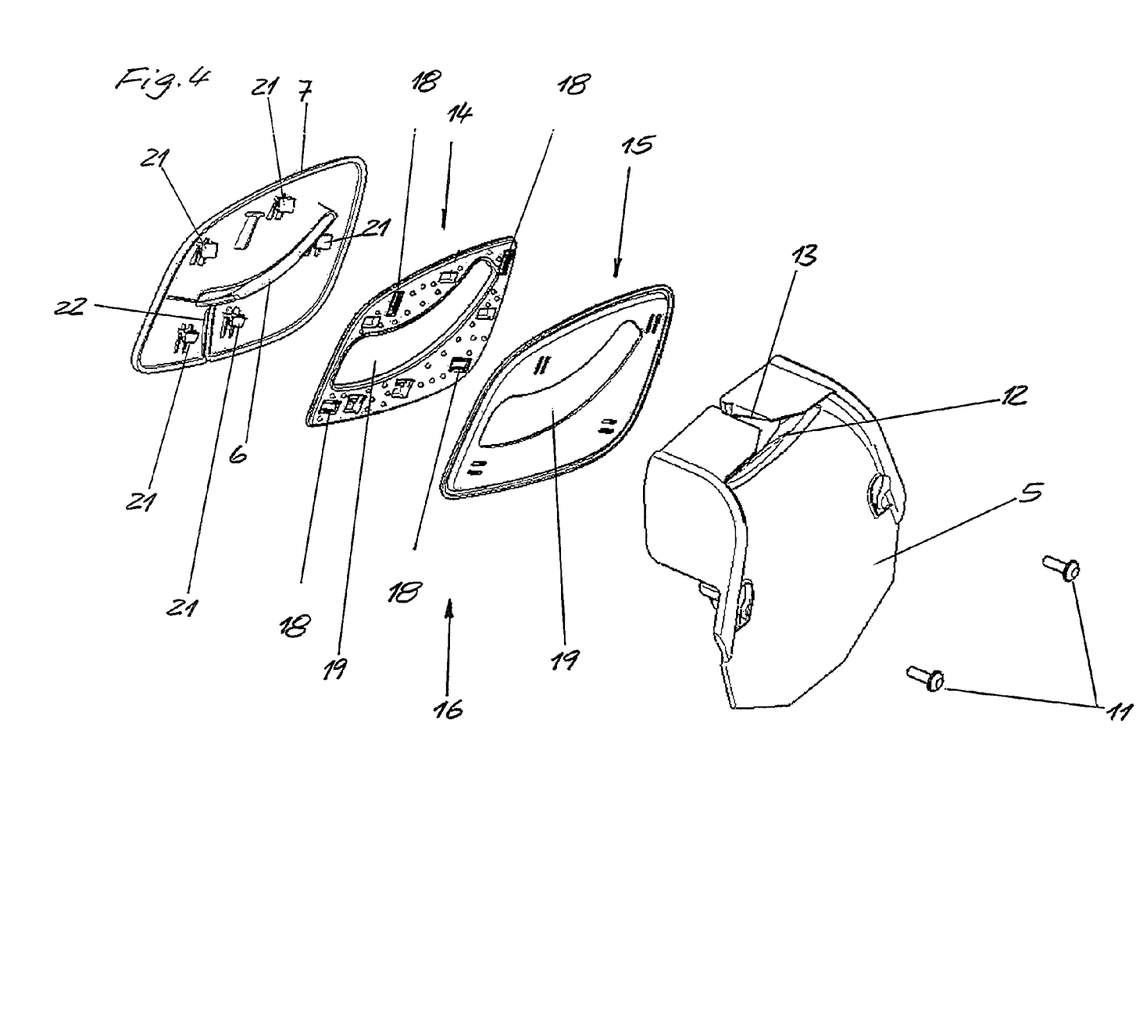
FIG. 4 shows the view of FIG. 3 in a perspective exploded view from the rear.

As shown in FIGS. 3 and 4, initially a lining cover 16 consisting of a cover front part 14 and a cover rear part 15 and then the belt cover 7 are arranged in the direction of travel in front of the belt deflector 5.

The cover front part 14 has latching recesses 18 in which corresponding first latching elements 17 of the cover rear part 15 may be engaged, in order to connect the cover front part 14 of plate-like configuration to the cover rear part 15 which is also of plate-like configuration to the lining cover 16.

The outer contours of the cover front part 14 and the cover rear part 15 consist of a plastics material, as does the belt cover 7.

Aligned with the belt runner opening 12, the cover front part 14 and the cover rear part 15 have a through-opening 19, the cross section thereof having a shape and size such that the belt end fitting 8 and an insertion tongue 26 may be passed through.

The cover front part 14 has on its side facing the belt cover 7 second latching elements 20 with which corresponding counter latching elements 21 of the belt cover 7 may be latched for fastening the belt cover 7 to the lining cover 16.

Aligned with the through-opening 19, the belt guide slot 6 is formed in the belt cover 7 so as to correspond to the width and thickness of the seat belt 4.

In order to insert the seat belt 4 into the belt guide slot 6, a thread-in slot 22 is formed in the belt cover 7, said thread-in slot in the direction of extension of the seat belt 4 connecting the belt guide slot 6 to the peripheral contour of the belt cover 7 which consists of plastics.

Figure 5:
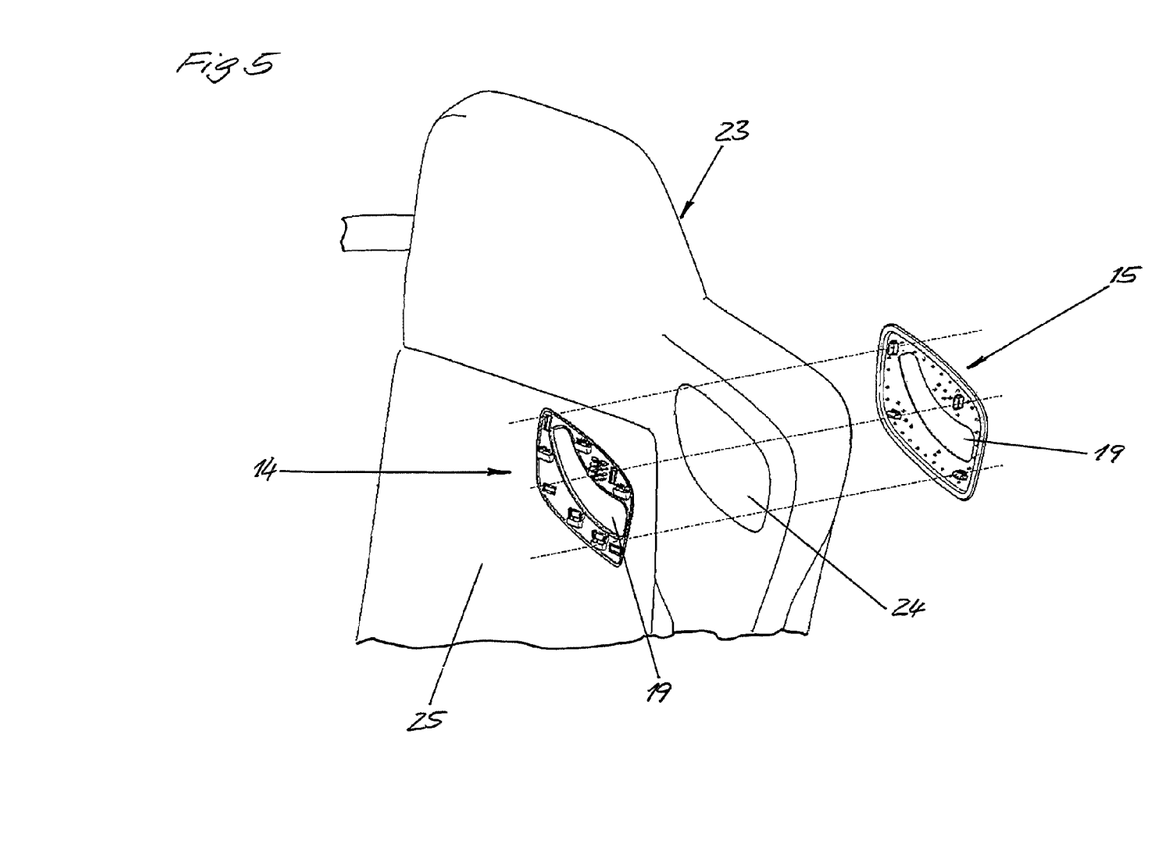
FIG. 5 shows a perspective view of the upper part of a backrest of the motor vehicle seat according to FIG. 1.
Figure 6:
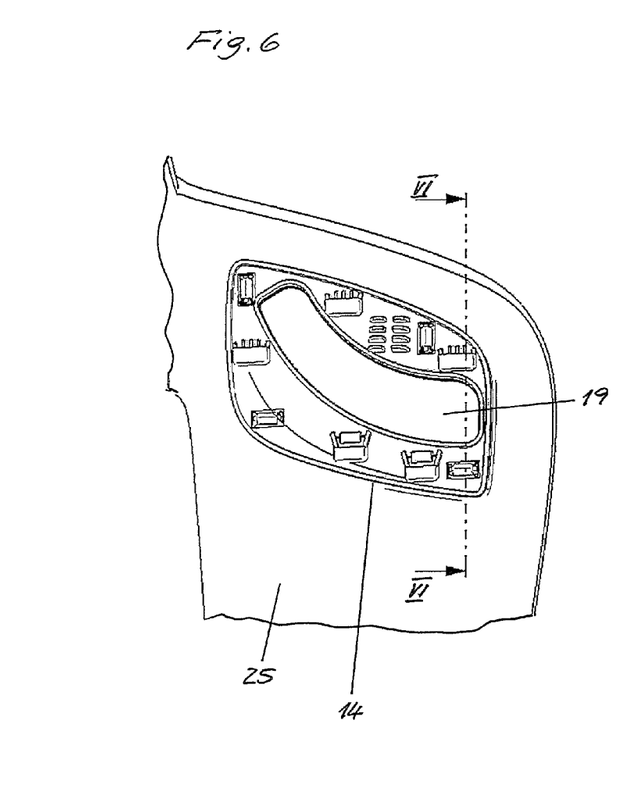
FIG. 6 shows a front view of the upper region of the backrest of the motor vehicle seat on the vehicle sill side according to FIG. 1 without the belt cover.
Figure 7:
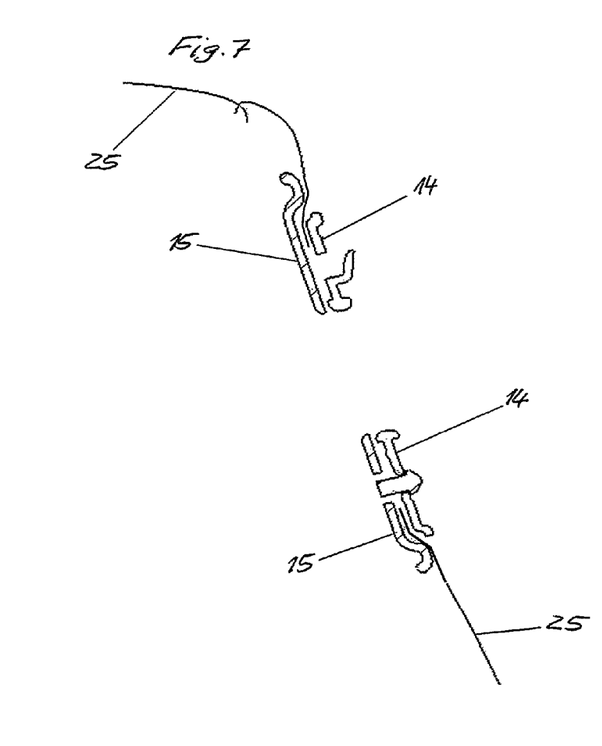
FIG. 7 shows a sectional view along the line VI-VI of FIG. 6.

As shown in FIG. 5, a backrest lining 23 is configured such that it is able to be pulled in a covering manner over the backrest structure 1, which is provided with a cushion, as well as the belt deflector 5 and the belt deflector holder 10.

Aligned with the belt runner opening 12 of the belt deflector 5, the backrest lining 23 has on its front cover part 25 a belt through-opening 24, in the region thereof the lining cover 16 being fastened to the cover part 25 of the backrest lining 23 on the front face, so that the through-opening 19 of the lining cover 16 is aligned with the belt through-opening 24.

To this end, the cover rear part 15 is correspondingly placed on the inside of the cover part 25 and the cover front part 14 is correspondingly placed on the outer face of the cover part 25, and by pressing together the cover rear part 15 and the cover front part 14 they are latched together and thus also connected to the cover part 25. The cover front part 14 and the cover rear part 15 thus form the lining cover 16 which partially encompasses the cover part 25 and thus also the backrest lining 23.

For mounting the seat belt 4, the backrest lining 23 is pulled over the backrest structure 1 covered with a cushion. In this case, the end provided with the belt end fitting 8 of the seat belt 4 bearing an insertion tongue 26 is guided on the rear face of the backrest structure 1 under the backrest lining 23 to the belt deflector 5, through the belt runner opening 12 thereof and through the through-opening 19 of the lining cover 16. Furthermore, in this case the insertion tongue 26 is also guided through the lining cover 16. For locking the seat belt 4, the insertion tongue 26 is able to be inserted in a lock arranged adjacent to or on the seat part structure 2 on the tunnel side.

The seat belt 4 is guided with its belt end fitting 8 on from the lining cover 16 as far as the rear end of the seat part structure 2 on the vehicle sill side, and the belt end fitting 8 is fastened by means of the screw 9 to the seat part structure 2. The fastening may also be carried out on a component fixed to the vehicle.

Figure 8:
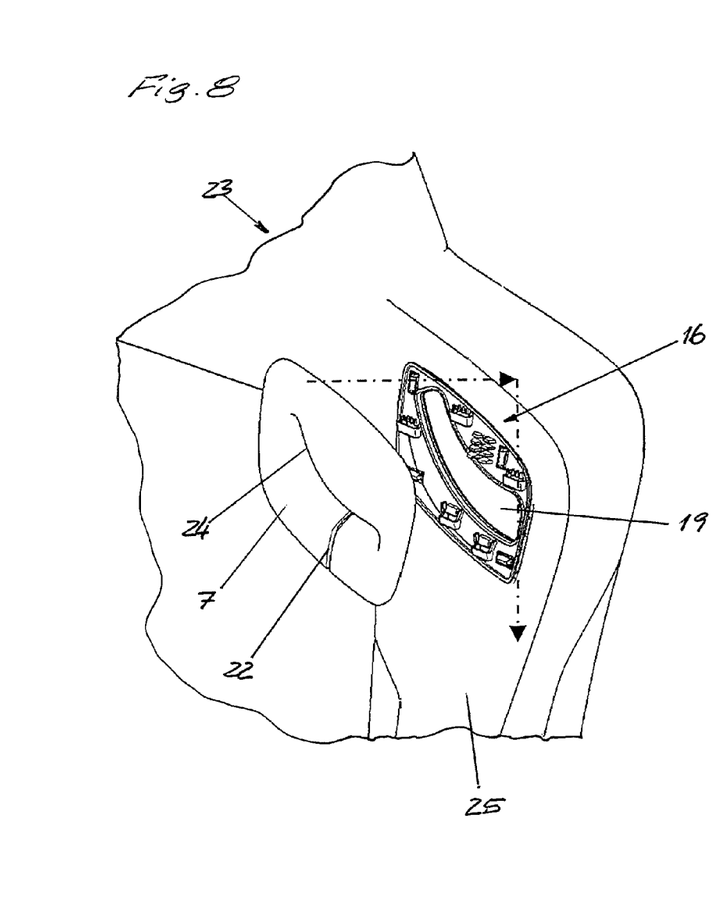
FIG. 8 shows a perspective front view of the upper region of the backrest of the motor vehicle seat on the vehicle sill side according to FIG. 1 with an exploded view of the belt cover.

The region of the seat belt 4 protruding from the lining cover 16 is now threaded, via the thread-in slot 22, into the belt guide slot 6 of the belt cover 7 and the belt cover 7 is latched onto the lining cover 16.

Figure 9:
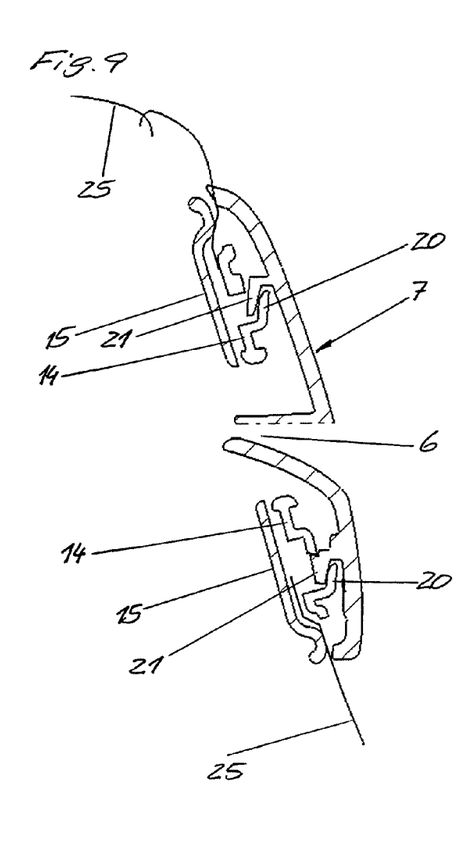
FIG. 9 shows a sectional view along the line VI-VI of FIG. 6, additionally with the mounted belt cover.

Thus the belt cover 7 is connected fixedly via the lining cover 16 to the cover part 25 of the flexible backrest lining 23 but not to the belt deflector 5.

In this manner, the running of the belt is affected by the belt deflector 5 and not by the lining cover 16 and the belt cover 7, so that the position of the deflection point in the belt runner opening 12 of the belt deflector 5 is also not influenced and thus also not altered.

LIST OF REFERENCE NUMERALS

1 Backrest structure
2 Seat part structure
3 Belt roller mechanism
4 Seat belt
5 Belt deflector
6 Belt guide slot
7 Belt cover
8 Belt end fitting
9 Screw
10 Belt deflector holder
11 Screws
12 Belt runner opening
13 Insertion slot
14 Cover front part
15 Cover rear part
16 Lining cover
17 First latching elements
18 Latching recesses 19 Through-opening
20 Second latching elements
21 Counter latching elements
22 Thread-in slot
23 Backrest lining
24 Belt through-opening
25 Cover part
26 Insertion tongue

The invention claimed is:

1. A vehicle seat for a vehicle, comprising:
   a seat part structure;
   a backrest structure pivotably arranged with a lower end of the backrest structure on the seat part structure and covered by a backrest lining; and
   a belt deflector with a belt runner opening for a seat belt being fastened to an upper region of said backrest structure on a vehicle sill side, said belt runner opening being oriented in a longitudinal direction of the vehicle, and said seat belt being guided out of a belt roller mechanism fixedly receiving one end of the seat belt through the belt runner opening of the belt deflector,
   wherein the belt deflector is covered by the backrest lining,
   wherein the backrest lining comprises a continuous belt through-opening which coincides with the belt runner opening, said belt through-opening being covered on a backrest front face by a belt cover comprising a belt guide slot, fixedly connected to the backrest lining, and not fixedly connected to the belt deflector,
   wherein the belt cover which bears against the backrest lining on the backrest front face is connected to a lining cover partially encompassing the backrest lining, and
   wherein the lining cover comprises a through-opening aligned with the belt runner opening and the belt guide slot.

2. The vehicle seat as claimed in claim 1, wherein the seat belt is guided from the belt roller mechanism arranged on a backrest rear face of the vehicle seat in a floor region, over the backrest rear face of the vehicle seat or the backrest structure to the belt deflector, through the belt runner opening thereof and the belt through-opening and the belt guide slot to the backrest front face and from there to a belt end fitting arranged on the seat part structure on the vehicle sill side, and
   wherein a second end of the seat belt is fixedly connected to the belt end fitting, and
   wherein an insertion tongue is displaceably arranged between the belt guide slot and the belt end fitting on the seat belt and is able to be connected to a lock arranged on the seat part structure on a tunnel side.

3. The vehicle seat as claimed in claim 2, wherein the seat belt is guided inside the backrest lining, which covers the backrest on the backrest front face and the backrest rear face, from the belt roller mechanism to the belt deflector.

4. The vehicle seat as claimed in claim 2, wherein the belt runner opening of the belt deflector, the through-opening of the lining cover, or a combination thereof has a cross section permitting the belt end fitting to be passed through.

5. The vehicle seat as claimed in claim 1, wherein the belt cover is connected by a latching connection to the lining cover.

6. The vehicle seat as claimed in claim 1, wherein the lining cover comprises of a cover front part bearing on the backrest lining on the backrest front face and a cover rear part bearing on a backrest lining on the backrest rear face, which are connected together, and wherein the belt cover bears on the backrest lining via the cover front part.

7. The vehicle seat as claimed in claim 6, wherein the cover front part and the cover rear part are able to be connected together by a latching connection.

8. The vehicle seat as claimed in claim 1, wherein a cross section of the belt guide slot corresponds to a cross section of the seat belt.

9. The vehicle seat as claimed in claim 1, wherein the belt cover has a thread-in slot connecting the belt guide slot with a peripheral contour of the belt cover, the thread-in slot running in a direction of extension of the seat belt.

10. A vehicle seat for a vehicle, comprising:
    a seat part structure;
    a backrest structure pivotably arranged with a lower end of the backrest structure on the seat part structure and covered by a backrest lining; and
    a belt deflector with a belt runner opening for a seat belt being fastened to an upper region of said backrest structure on a vehicle sill side, said belt runner opening being oriented in a longitudinal direction of the vehicle, and said seat belt being guided out of a belt roller mechanism fixedly receiving one end of the seat belt through the belt runner opening of the belt deflector,
    wherein the belt deflector is covered by the backrest lining,
    wherein the backrest lining comprises a continuous belt through-opening which coincides with the belt runner opening, said belt through-opening being covered on a backrest front face by a belt cover comprising a belt guide slot, fixedly connected to the backrest lining, and not fixedly connected to the belt deflector, and
    wherein the belt cover has a thread-in slot connecting the belt guide slot with a peripheral contour of the belt cover, the thread-in slot running in a direction of extension of the seat belt.

* * * * *